Jan. 21, 1930.  J. B. STRAUSS  1,744,588
LAMINATED EYEBAR AND PROCESS OF MAKING THE SAME
Filed July 20, 1927
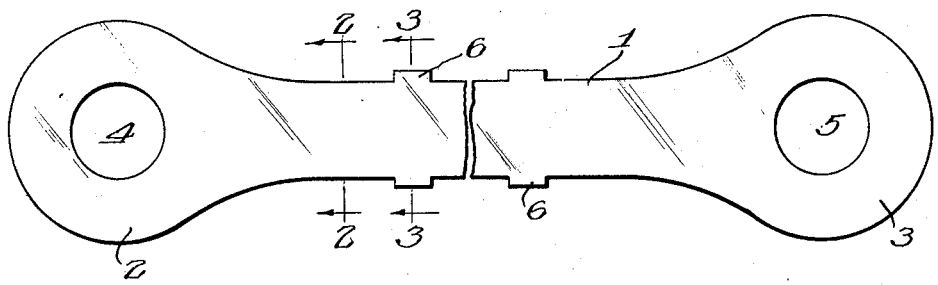
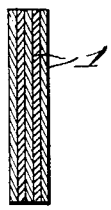
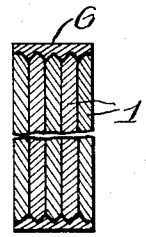
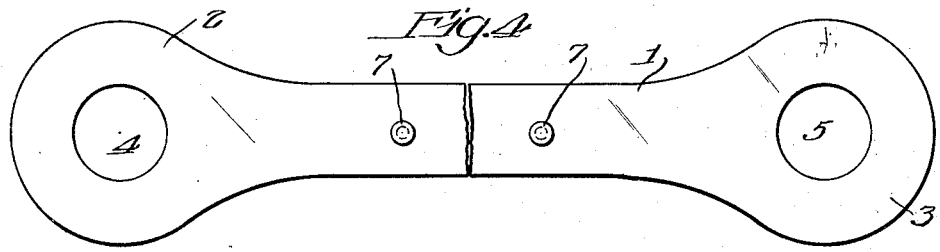
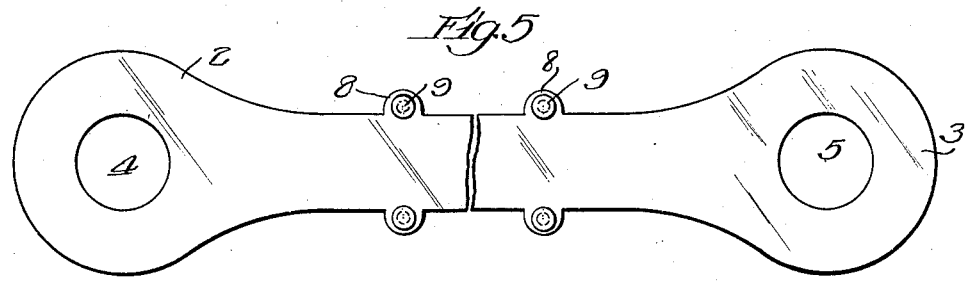
Inventor:
Joseph B. Strauss
By Parker + Carter Attys Patented Jan. 21, 1930

1,744,588

UNITED STATES PATENT OFFICE

JOSEPH B. STRAUSS, OF CHICAGO, ILLINOIS

LAMINATED EYEBAR AND PROCESS OF MAKING THE SAME

Application filed July 20, 1927. Serial No. 207,094.

This invention relates to laminated eyebars and the process of making the same and has for its object to provide a new and improved device and process of this description.

The invention has as a further object to provide an eyebar which shall have great strength per unit of weight.

The invention has as a further object to provide a laminated eyebar made from sheets of aluminum, preferably an aluminum alloy such as a copper alloy or the like thereby securing the lightness and great strength combined.

The invention has as a further object to provide an eyebar particularly adapted for use in bridges and similar structures.

Referring now to the drawings, Fig. 1 is a view of one form of eyebar embodying the invention.

Fig. 2 is a sectional view taken on line 2—2 of Fig. 1.

Fig. 3 is a sectional view taken on line 3—3 of Fig. 1.

Fig. 4 is a view showing a modified construction.

Fig. 5 is a view showing a further modified construction.

Like numerals refer to like parts throughout the several figures.

In carrying out my invention I provide a series of plates 1 which may be stamped or otherwise formed from sheets of metal. These plates are provided with enlarged ends or heads 2 and 3 having holes 4 and 5 stamped therein for the pins by means of which the eyebars are held in place.

These plates or laminae may be made of steel but are preferably made of aluminum or some alloy of aluminum such as a copper alloy or an alloy which will retain the lightness of the aluminum and yet secure great strength and rigidity. These plates or laminae are then placed together to secure the proper thickness and are connected so as to form an eyebar. The plates may be connected in any desired manner by welding or rivets or other fastening devices.

In Figs. 1 and 2, the laminae are shown as being fastened together by welding at different points as for example the points 6. In Fig. 4 the laminae are connected together by means of fastening devices 7 which extend through the body of the laminae at separated points as shown. In Fig. 5 the laminae are provided with lugs 8 at their edges and the fastening devices 9 pass through openings in these lugs. The structure shown in Figs. 1 and 2 where the laminae are welded together, has the greatest efficiency as the metal is not weakened by having holes therethrough. The construction shown in Fig. 5 is next in efficiency because of the particular manner of locating the holes in the lugs.

This construction is particularly adapted for the use of aluminum. Aluminum is formed in plates and these plates can then be stamped to form the eyebars. The strength may be increased by the use of an aluminum alloy such as a copper alloy. By this means great lightness combined with strength is secured and this is of vital importance in such structures as bridges. The expense and uncertainty of heat treated bars is also obviated.

In the claims where I use the term "aluminum" I mean to include aluminum or any suitable aluminum alloy.

I claim:

1. An eyebar comprising a series of laminae, said laminae each having a bar section and two enlarged heads, said enlarged heads being provided with pin holes, and means for joining the laminae together so that they act as a unit in transmitting stress.

2. An eyebar comprising a series of sheets af aluminum provided with enlarged ends, the enlarged ends having holes therethrough, the several sheets being joined together so as to act as a unit in transmitting stress.

3. The process of fabricating eyebars having a bar section and two enlarged heads comprising the stamping of laminae in the shape and length of the finished eyebar and then welding the laminae together for a portion of their length so that they act as a unit in transmitting stress.

4. The process of fabricating eyebars having a bar section and two enlarged heads comprising the stamping of these laminae in the length and shape of the finished eyebar, and simultaneously stamping a pin hole in each head and then joining the laminæ together at a point intermediate the pin holes so that they act as a unit in transmitting stress.

5. An eyebar comprising a series of sheets of metal each having a bar section and two enlarged heads, said enlarged heads being provided with pin holes, the plates being welded together for a portion of their length so that they act as a unit in transmitting stress.

6. An eyebar comprising a series of sheets of metal, projections on said sheets intermediate their ends and integral therewith, said projections being united so as to rigidly connect the bars together.

Signed at Chicago, county of Cook and State of Illinois, this Seventh day of July, 1927.

JOSEPH B. STRAUSS.